United States Patent
Onogawa et al.

(10) Patent No.: US 9,787,636 B2
(45) Date of Patent: Oct. 10, 2017

(54) RELAY DEVICE AND CONTROL METHOD OF RELAY DEVICE

(71) Applicant: Yamaha Corporation, Hamamatsu-shi, Shizuoka (JP)

(72) Inventors: Shinya Onogawa, Hamamatsu (JP); Kazuhiro Osakabe, Hamamatsu (JP)

(73) Assignee: Yamaha Corporation, Hamamatsu-shi, Shizuoka (JP)

(*) Notice: Subject to any disclaimer, the term of this patent is extended or adjusted under 35 U.S.C. 154(b) by 0 days.

(21) Appl. No.: 14/411,583

(22) PCT Filed: May 13, 2014

(86) PCT No.: PCT/JP2014/062672
§ 371 (c)(1),
(2) Date: Dec. 29, 2014

(87) PCT Pub. No.: WO2014/185394
PCT Pub. Date: Nov. 20, 2014

(65) Prior Publication Data
US 2015/0195247 A1    Jul. 9, 2015

(30) Foreign Application Priority Data

May 16, 2013    (JP) ................................. 2013-103857

(51) Int. Cl.
*G06F 21/56* (2013.01)
*H04L 29/06* (2006.01)
(Continued)

(52) U.S. Cl.
CPC ........ *H04L 63/0209* (2013.01); *G06F 21/606* (2013.01); *H04L 51/12* (2013.01);
(Continued)

(58) Field of Classification Search
CPC combination set(s) only.
See application file for complete search history.

(56) References Cited

U.S. PATENT DOCUMENTS

2001/0054157 A1* 12/2001 Fukumoto ........... H04L 63/0281
726/11
2002/0116641 A1* 8/2002 Mastrianni ........... G06Q 10/107
726/11
(Continued)

FOREIGN PATENT DOCUMENTS

JP    2005-208780 A    8/2005
JP    2007-226608 A    9/2007
(Continued)

OTHER PUBLICATIONS

Chinese Notification of Second Office Action issued in Chinese counterpart application No. 201480001626.2 dated Feb. 16, 2017, with partial English translation (Fourteen (14) pages).
(Continued)

*Primary Examiner* — Josnel Jeudy
(74) *Attorney, Agent, or Firm* — Crowell & Moring LLP

(57) ABSTRACT

An occurrence of virus infection and fraud caused by web access is prevented in advance without any particular restriction. A relay device (10) which connects an in-house LAN (20) to a wide area network (30) includes a URL checker (1510) for determining whether or not a URL is included in an email transmitted to the in-house LAN (20) from the wide area network (30), and registering the URL in a URL database (154*d*) when the URL is included; and a redirect section (1512) for determining whether or not a URL associated with a corresponding web server is registered in the URL database (154*d*) in response to detection of access from a terminal device within the in-house LAN (20) to the web server device in the wide area network (30), displaying a redirect screen inquiring whether to perform web access in
(Continued)

the terminal device when there is a registered URL, and relaying the web access when an reply allowing the access is obtained.

10 Claims, 6 Drawing Sheets

(51) Int. Cl.
  *H04L 12/58* (2006.01)
  *G06F 21/60* (2013.01)
  *H04L 29/08* (2006.01)
(52) U.S. Cl.
  CPC ........ *H04L 63/0227* (2013.01); *H04L 63/145* (2013.01); *H04L 63/1483* (2013.01); *H04L 67/02* (2013.01)

(56) References Cited

U.S. PATENT DOCUMENTS

| | | | |
|---|---|---|---|
| 2004/0141644 A1* | 7/2004 | Kurosawa | H04M 1/2755 382/182 |
| 2005/0188036 A1 | 8/2005 | Yasuda | |
| 2005/0198144 A1* | 9/2005 | Kraenzel | G06Q 10/107 709/206 |
| 2007/0201508 A1* | 8/2007 | Blackford | H04L 12/2898 370/466 |
| 2007/0218874 A1* | 9/2007 | Sinha | H04L 43/04 455/411 |
| 2008/0244070 A1 | 10/2008 | Kita et al. | |
| 2008/0250490 A1* | 10/2008 | Sriram | H04L 63/0281 726/12 |
| 2009/0116499 A1* | 5/2009 | Kokado | H04L 12/2838 370/401 |
| 2011/0075652 A1* | 3/2011 | Ogura | H04L 65/4053 370/351 |
| 2013/0246507 A1* | 9/2013 | Amemiya | H04L 67/2814 709/203 |

FOREIGN PATENT DOCUMENTS

| | | |
|---|---|---|
| JP | 2008-276760 A | 11/2008 |
| JP | 2009-124194 A | 6/2009 |
| JP | 2010-187340 A | 8/2010 |

OTHER PUBLICATIONS

Chinese Office Action issued in Chinese counterpart application No. 201480001626.2 dated Jul. 4, 2016, with English translation (Eighteen (18) pages).

International Search Report (PCT/ISA/210) dated Aug. 5, 2014, with English translation (two (2) pages).

Japanese Office Action issued in Japanese counterpart application No. 2013-103857 dated May 23, 2017, with English translation (Five (5) pages).

* cited by examiner (a) NAME, LAST NAME, INDICATED NAME, NICKNAME, EMAIL ADDRESS, OTHER EMAIL ADDRESS, ..., NOTE,
,, 1234,, 1234@example.jp,, ...,,
,, abcd,, abcd@example.jp,, ...,, (b) INDICATED NAME, EMAIL ADDRESS, HOME ADDRESS, JOB
1234, 1234@example.jp,, ...,, (a)

| SOURCE ADDRESS | DESTINATION ADDRESS | TYPE IDENTIFIER |
|---|---|---|
| 1234@example.jp | * | pass |
| abcd@example.jp | * | pass |
| router@example.jp | * | pass |
| OTHERS | * | reject |

(b)

| SOURCE ADDRESS | DESTINATION ADDRESS | TYPE IDENTIFIER |
|---|---|---|
| * | 1234@example.jp | pass |
| * | abcd@example.jp | pass |
| * | OTHERS | reject |

FIG.7

| SOURCE ADDRESS | DESTINATION ADDRESS | TERMINAL IDENTIFIER | TYPE IDENTIFIER | RESULT IDENTIFIER | NUMBER OF DETERMINATIONS |
|---|---|---|---|---|---|
| user0@example.jp | a@example.jp | IP-0 | none | none | cnt0 |
| user1@example.jp | b@example.jp | IP-1 | pass | pass | cnt1 |
| ⋮ | ⋮ | ⋮ | ⋮ | ⋮ | ⋮ |
| userN@example.jp | N@example.jp | IP-N | reject | reject | cntN |

FIG.8

| URL | SOURCE ADDRESS | DESTINATION ADDRESS | TERMINAL IDENTIFIER | TYPE IDENTIFIER | RESULT IDENTIFIER | NUMBER OF RECEPTIONS |
|---|---|---|---|---|---|---|
| URL2 | user2@example.jp | a@example.jp | IP-2 | pass | OK | cnt2 |
| URL3 | user3@example.jp | b@example.jp | IP-3 | none | NG | cnt3 |
| ⋮ | ⋮ | ⋮ | ⋮ | ⋮ | ⋮ | ⋮ |
| URLX | userX@example.jp | X@example.jp | IP-X | none | OK | cntX |

FIG.9

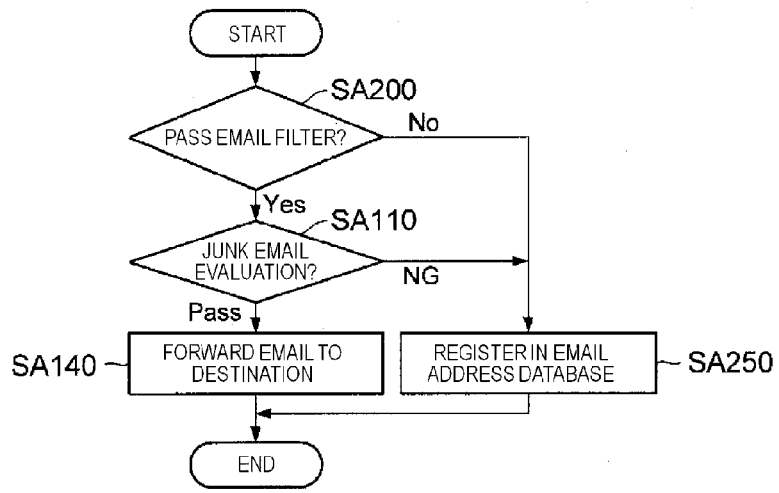

FIG.10

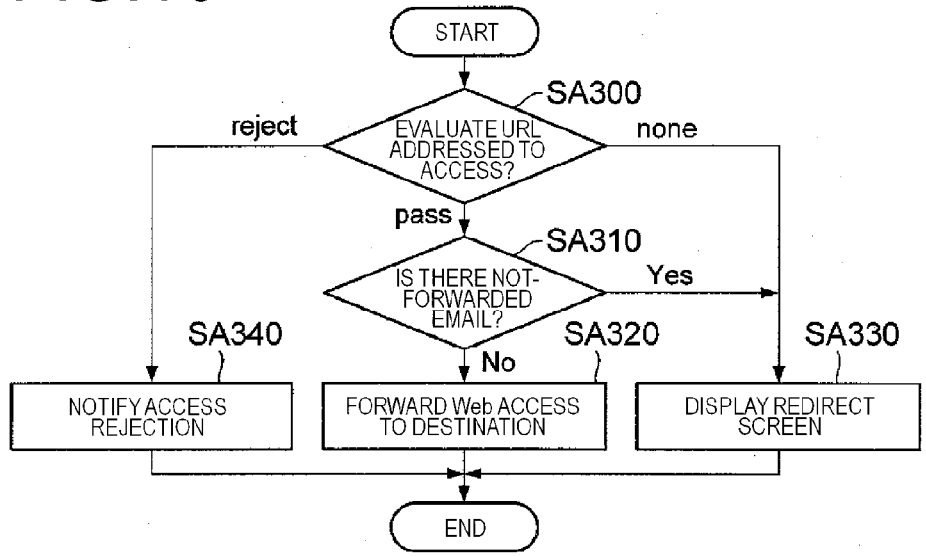

FIG.11

(a)
It is intended to try to access the following URL.
The URL is the URL described in the email that "local1@example.jp" has received, and there is a possibility of the site with risk.
   http://www.abcdefghijklmn.com
If you want to access the site as it is, please press [ALLOW] button. The site will be registered in a permission list, and from the next time, this screen will not be displayed.
If you reject access, the site is added to a rejection list.
[ALLOW][REJECT]

(b)
It is intended to try to access the following URL.
The URL is the URL described in the virus infected email or a spam email that "local1@example.jp" has received, and there is a possibility of risk of "virus infection or click fraud"
   http://www.abcdefghijklmn.com
If you want to access the site as it is, please press [ALLOW] button. The site will be registered in a permission list, and from the next time, this screen will not be displayed.
If you reject access, the site is added to a rejection list.
[ALLOW][REJECT]

FIG.12

(a)
It is intended to try to receive the following email.
　○user100@example.jp
　○user200@example.jp
　　→ local1@example.jp
Since the source address is not registered in the address book, it is not able to receive the email.
If you allow reception, please press [ALLOW] button. The allowed email address is added to the allowed destination list, and from the next time, this screen will not be displayed.
If you reject reception, it is added to a rejected destination list.

[ALLOW] [REJECT]

(b)
It is intended to try to transmit the following email.
local1@example.jp →
　○user100@example.jp
　○user200@example.jp
Since the destination address is not registered in the address book, it is not able to transmit the email.
If you allow transmission, please check the check box of the email addresses to be allowed and press [ALLOW] button. The allowed email address is added to the allowed destination list, and from the next time, this screen will not be displayed.
If you reject transmission, it is added to a rejected destination list.

[ALLOW] [REJECT]

FIG.13

It is intended to try to access the following URL.

The URL is the URL described in the virus infected email or a spam email that "local1@example.jp" has received, and there is a possibility of risk of "virus infection or click fraud"
　http://www.abcdefghijklmn.com Also, it is intended to try to receive the following email.

○ user100@example.jp
　○ user200@example.jp
　...
　→ local1@example.jp

Since the source address is not registered in the address book, it is not able to receive the email.
If you allow reception, please press [ALLOW] button. The allowed email address is added to the allowed destination list, and from the next time, this screen will not be displayed.
If you reject reception, it is added to a rejected destination list.

[ALLOW] [REJECT]

RELAY DEVICE AND CONTROL METHOD OF RELAY DEVICE

TECHNICAL FIELD

The present invention relates to a technology for preventing virus infection and fraud caused by web access.

BACKGROUND ART

With the spread of information gathering and commercial transaction through web sites, problems such as virus infection and fraud caused by web access have rapidly increased. An example of this type of problem includes a problem in that if users access spoofed web sites (in other words, fake web sites) spoofing membership web sites or web sites of large companies, the spoofed web sites bring virus and cause virus infection, and a problem of abuse of personal information (so-called phishing) is caused by the spoofed web sites causing the users to mistake them for real web sites and inducing the users to input personal information such as a credit card number. Accordingly, a technology for preventing these problems has been proposed (for example, the technology disclosed in Patent Literature 1, and the like).

Patent Literature 1 discloses a technology of determining whether or not a string representing a URL is included in an email text with respect to an email that has not passed a content check for junk email or an email delivered from a source when the flow rate aggregated for each source IP address exceeds a predetermined threshold, and when the URL is included, registering the string in a database and discarding the email including the text with the string. Generally, in many cases, a person who opens a web site with malicious intent carries out an advertisement such as a distribution of large amounts of emails in which the URL of the web site is written in the email texts in order to lure victims to the web site. The technology disclosed in Patent Literature 1 is to prevent the spread of such an email with an advertising purpose and to prevent the occurrence of virus infection and fraud.

CITATION LIST

Patent Literature

Patent Literature 1: JP-A-2005-208780
Patent Literature 2: JP-A-2010-187340

SUMMARY OF INVENTION

Technical Problem

However, in the technology disclosed in Patent Literature 1, the email for which the URL has been registered in the database is delivered to its destination. Therefore, in the technology disclosed in Patent Literature 1, there is a problem of not preventing fraud and virus infection when web access is made caused by the email. In addition, in the technology disclosed in Patent Literature 1, since the URL registration in the database is not performed until the flow rate exceeds the predetermined threshold, it is not possible to quickly cope with the problem, and there is a possibility that the damage has already expanded when the URL is registered in the database.

The present invention has been made in view of the problems, and an object thereof is to provide a technology quickly preventing the access to a web site that is opened with malicious intent, and preventing the spread of virus infection and fraud in advance.

Solution to Problem

In order to solve the problems, an aspect of the present invention provides a relay device which connects a local area network to a wide area network, the relay device including: an identifier checker, configured to determine whether or not an identifier uniquely indicating an available resource through the wide area network is included in an email that the local area network receives from the wide area network, and register the identifier in a database when the identifier is included; and a redirect section, configured to determine whether or not an identifier indicating a resource available through the wide area network is registered in the database in response to detection of access from a terminal device within the local area network to the available resource, display a screen inquiring whether to perform access in the terminal device when the identifier is registered, and relay the access when a reply allowing the access is obtained.

An example of the wide area network includes the Internet, and an example of the resource is a web server device connected to the Internet (a server device that manages a web site) or an FTP server device (a server device that delivers data using FTP), various types of data stored in server device, and programs executed by the server devices. An example of an identifier includes a URL and a URI of a web site. For example, when using the URL as the identifier, an identifier checker is a URL checker for determining whether or not the URL is included in the received email. In this case, according to the relay device of the present invention, the registration of the URL in the database is performed immediately in response to the relay of an email that is received in the local area network from the wide area network and contains a URL in the text. Then, when access from the terminal device within the local area network to the web server device connected to the wide area network is detected, it is determined whether or not the URL addressed to the web access is registered in the database, when the URL is registered, a reminder screen inquiring whether to continue the web access is displayed on the terminal device, and when a response of allowing the access is obtained, the relay of the web access is performed. Therefore, according to the relay device of the present invention, it is possible to prevent failure (in other words, expansion of damage) caused by the URL registration to the database not being performed until the email flow rate exceeds the predetermined threshold. In addition, an aspect of providing a program causing a computer to function as the respective sections or modules is considered as a further aspect of the present invention.

The relay device may be configured by including: a filter, configured to perform at least a first filtering process, among the first filtering process of filtering an email received in the local area network from the wide area network based on a source email address in the email, and a second filtering process of filtering an email transmitted from the local area network to the wide area network based on a destination email address of the email; and an email address database for storing the source email address or the destination email address of the email which is filtered by the filter, and a terminal identifier indicative of a destination or source terminal device thereof, wherein the redirect section determines whether there is an email that is filtered by the filter with reference to stored content of the email address database, among emails of which a destination or a source is a terminal device that performs access to the available resources through the wide area network, and displays a screen inquiring whether to release a filtering of a source email address with respect to the email that is filtered by the first filtering process in the terminal device, and displays a screen inquiring whether to release a filtering of a destination email address with respect to the email that is filtered by the second filtering process in the terminal device, and updates a filtering condition of the filter in response to an operation for each screen.

According to this aspect, it is possible to notify the source of the web access that there has been a filtered email in response to the reception of the web access, and to prompt updating of the filtering condition. In addition, as an execution mode of the filtering process in the relay device of this aspect, two modes are considered: a mode of performing only a first filtering process and a mode of performing both first and second filtering processes. In other words, the first filtering process is to be necessarily executed in the relay device of this aspect. Here, the reason of necessarily executing the first filtering process among both the first and second filtering processes is to prevent emails with advertising purposes and the like from being forwarded to the users unconditionally.

The relay device may be configured by including: an email storage section for storing the email that is filtered by the first filtering process; and an email generator/transmitter, configured to transmit the email stored in the email storage section as an email using with the relay device as a source, wherein the redirect section causes the email generator/transmitter to transmit an email transmitted to the terminal device from a source email address that is excluded from a filtering target, depending on update of the filtering condition of the first filtering process. According to the aspect, it is possible to store an email filtered by the first filtering process, and retransmit an email that has been transmitted from a source email address that is excluded from a filtering target at the time of updating the filtering condition, to the destination.

The relay device may be configured by including an email checker, configured to check whether or not the email that is filtered by the filter is a junk email, wherein the identifier checker checks an email that has passed a checking by the email checker as a check target. A specific example of junk email includes an email to which the computer virus is attached and a so-called spam email. According to the aspect, it is possible to prevent the junk email that has not been filtered due to impersonation of the source email address and the like from being forwarded to the terminal device within the local area unconditionally.

The relay device may be configured by including an address book analyzer, configured to analyze email address book data of a terminal device within the local area network and extract an email address; and an email filter data generator, configured to generate email filter data representing a filtering condition used by the filter based on the email address extracted by the address book analyzer, and send the email filter data to the filter.

According to the aspect, it is possible to automatically generate email filter data representing the filtering condition from address book data of the user, and to save time and effort required for generation as compared with the case of manually generating email filter data.

Another aspect of the present invention provides a control method of a relay device which connects a local area network to a wide area network, the control method including: determining whether or not an identifier uniquely indicating an available resource through the wide area network is included in an email that the local area network receives from the wide area network, and registering the identifier in a database when the identifier is included; and determining whether or not an identifier indicating a resource available through the wire area network is registered in the database in response to detection of access from a terminal device within the local area network to the available resource, displaying a screen inquiring whether to perform access in the terminal device when the identifier is registered, and relaying the access when an reply allowing the access is obtained.

Patent Literature 2 discloses a technology of preventing the transmission of an email of an uncertain source or destination by registering an address book of a mail application of a terminal used by each user in a server, and in the address book of a user transmitting an email and the address book of a user receiving an email, if the email addresses of each other are registered in the address books of each other, allowing the transmission of the email. In the technology disclosed in Patent Literature 2, there is a constraint that an email addressed to another party cannot be transmitted when the user's own email address is not registered in address book of the other party, and a constraint that it is necessary for the users transmitting and receiving emails to use the same system, but there is a problem that the actual situation is different. In contrast, in the relay device of the present aspects, since email filter data is generated from only email address book data of the terminal device within the local area network, such a failure does not occur. In other words, the present invention is a technology that is different from the disclosure in Patent Literature 2.

BRIEF DESCRIPTION OF DRAWINGS

FIG. 3 is a diagram illustrating an example of address book data which is input to the relay device 10.

FIG. 4 is a diagram illustrating an example of functional blocks that are implemented by a control unit 110 of the relay device 10 according to a relay control program 154a.

FIG. 7 is a diagram illustrating an example of stored content of an email address database 154c1 stored in the non-volatile storage unit 154 of the relay device 10.

FIG. 8 is a diagram illustrating an example of stored content of a URL database 154d stored in the non-volatile storage unit 154 of the relay device 10.

FIG. 9 is a flowchart illustrating a flow of relay control of an email transmitted from the in-house LAN 20 side to the wide area network 30 side.

FIG. 10 is a flowchart illustrating a flow of relay control of web access from the in-house LAN 20 side to the wide area network 30 side.

FIG. 11 is a diagram illustrating an example of a redirect screen displayed on a display unit of a terminal device.

FIG. 12 is a diagram illustrating an example of a redirect screen displayed on the display unit of the terminal device.

FIG. 13 is a diagram illustrating an example of a redirect screen displayed on the display unit of the terminal device.

DESCRIPTION OF EMBODIMENTS

Hereinafter, embodiments of the present invention will be described.

(A: Configuration)

Figure 1:
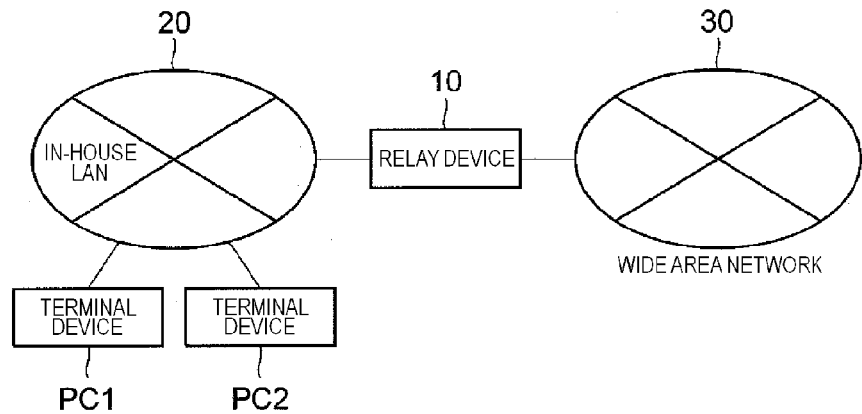
FIG. 1 is a diagram illustrating a configuration example of a communication system including a relay device 10 according to an embodiment of the present invention.

FIG. 1 is a diagram illustrating a configuration example of a communication system including a relay device 10 according to an embodiment of the present invention. The relay device 10 of the present embodiment is, for example, a router. As illustrated in FIG. 1, the relay device 10 connects an in-house Local Area Network (LAN) 20, which means a local area network provided in each site such as a headquarter or a branch of a company, to a wide area network 30 (for example, the Internet) which is shared by many unspecified persons. As illustrated in FIG. 1, the in-house LAN 20 includes terminal devices PC1 and PC2 used by employees who work at the site, and operated and managed by a network manager and the like.

The terminal devices PC1 and PC2 are personal computers connected to the in-house LAN 20 through a signal line such as a LAN cable. Various types of application software such as a web browser and a mailer application are pre-installed in the terminal devices PC1 and PC2. Note that in FIG. 1, it is illustrated a case where the two terminal devices are included in the in-house LAN 20 but, three or more terminal devices may be also included, or only one terminal device may be also included. In addition, the terminal device included in the in-house LAN 20 is not limited those connected by wire to the in-house LAN 20, and may be a wireless terminal device which is accommodated in the in-house LAN 20.

The relay device 10 relays data communication performed according to a predetermined communication protocol such an HTTP between a computer device included in the in-house LAN 20 (the terminal device PC1 or the terminal device PC2 in the present embodiment) and a resource available through the wide area network 30 (for example, a web server device connected to the wide area network 30). In the present embodiment, it is possible to prevent in advance fraud and virus infection when accessing the resource available through the wide area network 30 by using the terminal devices PC1 and PC2, by causing the relay device 10 to perform a relay control process remarkably showing the features of the present invention. Hereinafter, a description will be made focusing the relay device 10.

Figure 2:
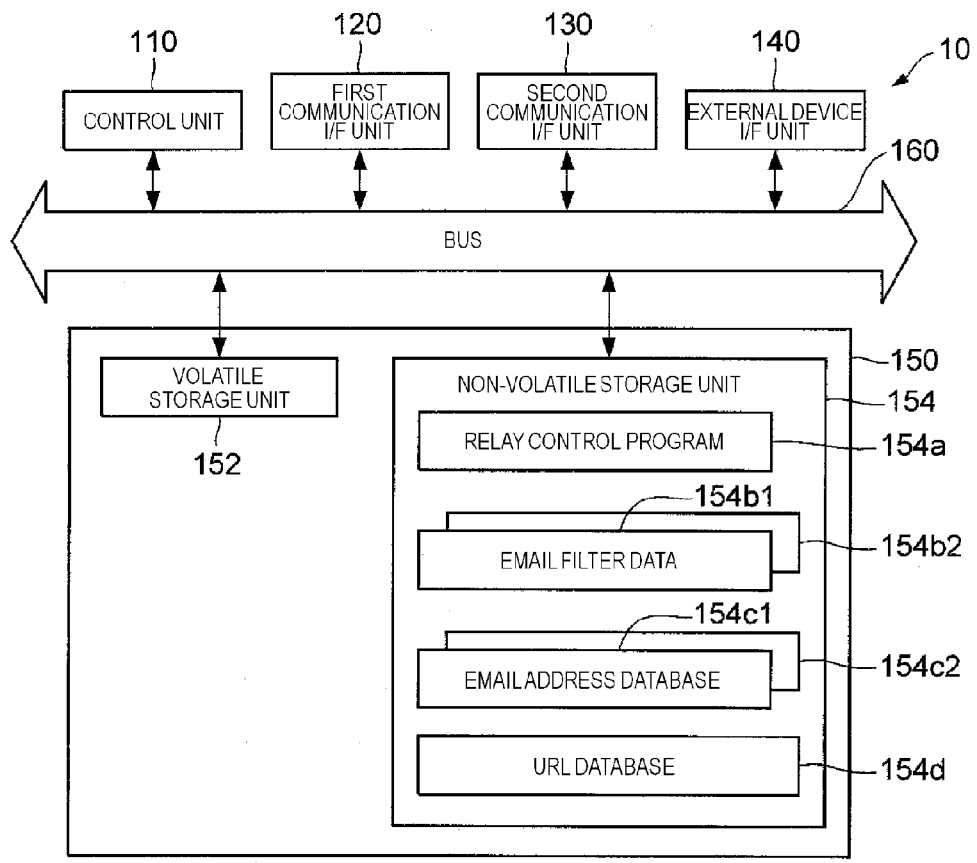
FIG. 2 is a block diagram illustrating a configuration example of the relay device 10.

FIG. 2 is a diagram illustrating a configuration example of the relay device 10. As illustrated in FIG. 2, the relay device 10 includes a control unit 110, a first communication I/F unit 120, a second communication I/F unit 130, an external device I/F unit 140, a storage unit 150, and a bus 160 that relays the exchange of data between these components.

The control unit 110 is a Central Processing Unit (CPU). The control unit 110 functions as a control center of the relay device 10, by performing a relay control program 154a in the storage unit 150 (more precisely, a non-volatile storage unit 154).

The first communication I/F unit 120 and the second communication I/F unit 130 are respectively Network Interface Cards (NIC), and are respectively connected to different communication networks. A more detailed description will be given, and the first communication I/F unit 120 is connected to the in-house LAN 20, and the second communication I/F unit 130 is connected to the wide area network 30. Each of the first communication I/F unit 120 and the second communication I/F unit 130 passes data received from a communication network of a connection destination to the control unit 110, and transmits the data passed from the control unit 110 to the communication network of the connection destination.

The external device I/F unit 140 is a set of a Universal Serial Bus (USB) interface and a serial interface. The external device is connected to the relay device 10 through a suitable interface among the various types of interfaces. For example, if the external device to be connected is a USB memory, it is connected to a USB interface. If the external device to be connected is a serial console, it is connected to a serial interface. In the present embodiment, the external device I/F unit 140 serves as an input section for inputting to the relay device 10 address book data of a user who performs transmission and reception of email by using a computer device included in the in-house LAN 20.

The address book data is a set of many pieces of data representing various types of information such as names, indication names in emails, and email addresses of other parties who are transmission and reception sources of emails such as friends, acquaintances, business partners of the owner of the address book data. An example of such address book data, as illustrated in FIG. 3(a) and FIG. 3(b), includes data of a CSV format in which strings representing the various types of information are separated by a comma (,) and arranged, and the like. FIG. 3(a) and FIG. 3(b) are diagrams illustrating an example of address book data of mailers of types different from each other. As illustrated in FIG. 3(a) and FIG. 3(b), generally, what data is contained in the address book data may be varied depending on the type of mailers, but at least the string representing the email address of the other party should be included. In addition, in the present embodiment, alphanumeric characters or a string including a delimiter "@" in the middle is regarded as an email address.

The storage unit 150 includes a volatile storage unit 152 and a non-volatile storage unit 154, as described in FIG. 2. The volatile storage unit 152 is, for example, a Random Access Memory (RAM). The control unit 110 uses the volatile storage unit 152 as a work memory when executing the relay control program 154a. The non-volatile storage unit 154 is, for example, a hard disk or a flash memory. The non-volatile storage unit 154 stores the relay control program 154a for causing the control unit 110 to execute a relay control process that remarkably represents the characteristics of the present embodiment, and a determination program (such as a virus check program, not shown in FIG. 2) that determines whether or not a received email is junk email. Further, the non-volatile storage unit 154 stores various types of data to be referred to and updated in the execution process of the relay control program 154a. An example of the data stored in the non-volatile storage unit 154 includes email filter data 154b1 and 154b2, email address databases 154c1 and 154c2, and an URL database 154d. The roles and structures of these various types of data will be given in a description of an operation example thereof in order to avoid duplication.

Figures 3, 4:
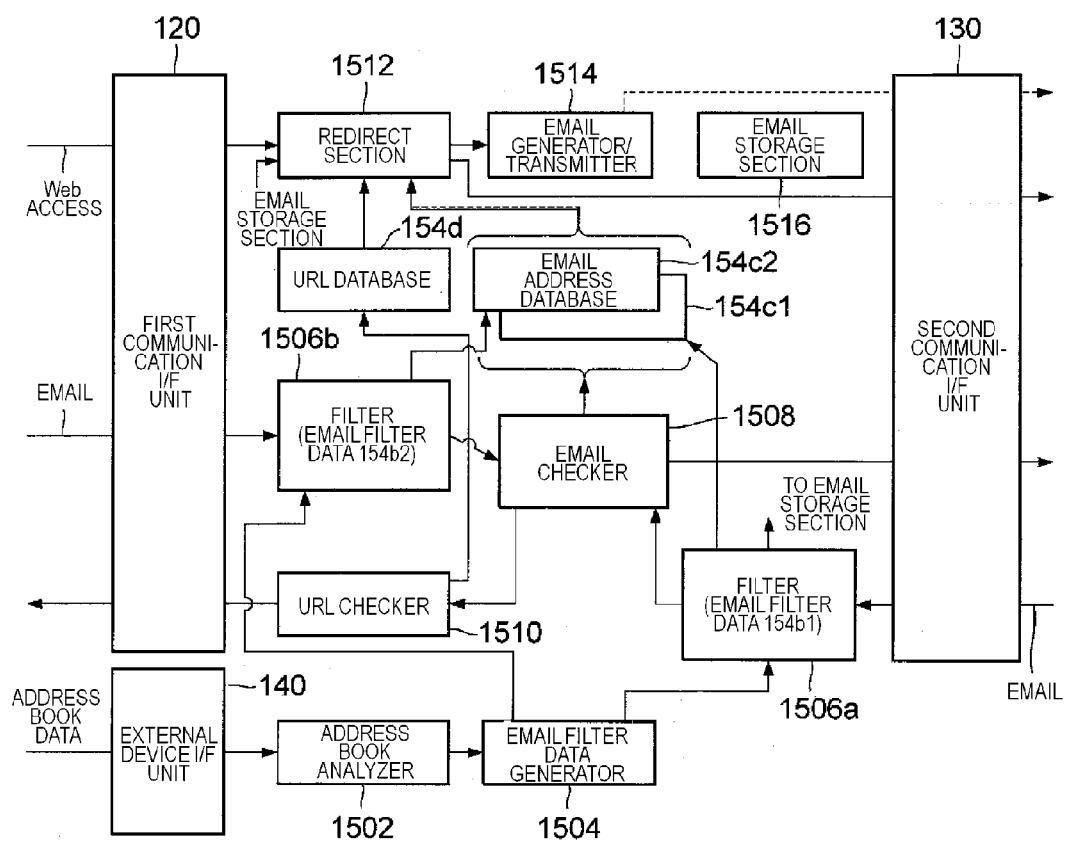

If power of the relay device 10 (not shown in FIG. 2) is turned on or reset, the control unit 110 reads the relay control program 154a from the non-volatile storage unit 154 into the volatile storage unit 152 so as to start execution of the program. The control unit 110 executes the relay control program 154a and functions as an address book analyzer 1502, email filter data generator 1504, filters 1506a and 1506b, an email checker 1508, a URL checker 1510, a redirect section 1512, and an email generator/transmitter 1514, which are shown in FIG. 4. Further, the non-volatile storage unit 154 also functions as an email storage section 1516. The roles of respective means will be given in a description of an operation example thereof in order to avoid duplication. The above description has been made about the configuration of the relay device 10.

(B: Operation Example)

Next, an operation performed by the relay device 10 will be described.

(B-1: Email Filter Data Generation Operation)

In the present embodiment, email filter data 154b1 and 154b2 indicating a filtering condition is generated, based on address book data transmitted through the external device I/F unit 140. The filtering refers to postponing the forwarding of an email that has been received from the in-house LAN 20 or the wide area network 30, and the filtering condition refers to a condition that the email of which forwarding has been postponed should satisfy. The email filter data 154b1 is data representing a filtering condition when the in-house LAN 20 filters the email received from the wide area network 30 based on the source email address. Meanwhile, the email filter data 154b2 is data representing a filtering condition when the email transmitted from the in-house LAN 20 to the wide area network 30 is filtered based on the destination email address.

The address book analyzer 1502 in FIG. 4 analyses address book data that is input through the external device I/F unit 140 so as to extract an email address (string formed of alphanumeric characters including the above-mentioned predetermined delimiters therein), and sends the email address to the email filter data generator 1504. When, for example, the address book data shown in FIG. 3(a) is input through the external device I/F unit 140, as the address book data, the address book analyzer 1502 extracts email address "1234@example.jp" and "abcd@example.jp" from the address book data and sends the extracted email addresses to the email filter data generator 1504. The email filter data generator 1504 generates the email filter data 154b1 and 154b2, based on the email address given from the address book analyzer 1502, and sends the generated email filter data 154b1 and 154b2 to the filter 1506a and 1506b, respectively.

FIG. 5(a) is a diagram illustrating an example of the email filter data 154b1, and FIG. 5(b) is a diagram illustrating an example of the email filter data 154b2. As illustrated in FIG. 5(a) and FIG. 5(b), the email filter data 154b1 and 154b2 is a set of records that are formed of a pair of a destination address and a source address which are associated with each other, and a type identifier. The type identifiers in FIG. 5(a) and FIG. 5(b) are identifiers indicating whether to forward an email in which the source address associated with the type identifier is set as a source email address and the destination address is set as a destination email address (pass means allowance of forwarding, and reject means forwarding rejection). In addition, "*" in the destination address of FIG. 5(a) or in the source address of FIG. 5(b) means that an address value is not inquired at the time of determination of whether to forward an email.

The email filter data generator 1504 generates email filter data 154b1 as the following three types of sets of records. First, there is a record in which "*", the email address given from the address book analyzer 1502, and "pass" are respectively set in the destination address, the source address, and the type identifier. Second, there is a record in which "*", the email address of the relay device 10 (in the present embodiment, router@example.jp), and "pass" are respectively set in the destination address, the source address, and the type identifier. Third, there is a record in which "*", "others" (in other words, a value indicating an email address which is not the email address given from the address book analyzer 1502 and is not the email address of the relay device 10), and "reject" are respectively set in the destination address, the source address, and the type identifier. In addition, when the email filter data 154b1 has been already generated, the email filter data generator 1504 determines whether or not the email address given from the address book analyzer 1502 has been registered in the email filter data 154b1 for each email address, and additionally registers the email address in the case of being unregistered (the same applies to the email filter data 154b2).

Further, the email filter data generator 1504 registers the source address in which the "pass" is set in the type identifier in the email filter data 154b1 in the email address database 154c1. Further, in FIG. 4, in order to avoid complexity of the drawings, the illustration of an arrow representing the access by the email filter data generator 1504 to the email address database 154b1 is omitted. The email address database 154c1 is, as illustrated in FIG. 7, a database in which respective pieces of a source address, a destination address, a terminal identifier, a type identifier, a result identifier and the number of determinations are associated and stored. The email address database 154c1 stores information regarding an email received in the in-house LAN 20 from the wide area network 30. For example, a source email address of the email, a destination email address of the email, and a terminal identifier of a terminal device of a destination of the email are respectively set in the source address, the destination address, and the terminal identifier. The registration of the respective pieces of data to the email address database 154c1 is basically performed by the filter 1506a, but registration for the source address in the email filter data 154b1 in which "pass" is set in the type identifier is performed by the email filter data generator 1504. The meaning of respective pieces of data of the type identifier, the result identifier, and the number of determinations which are registered in the email address database 154c1 in association with the source address, the destination address, and the terminal identifier becomes clear in the description of the filter 1506a. When the source address in the email filter data 154b1 in which "pass" is set in the type identifier is registered in the email address database 154c1, the email filter data generator 1504 sets the source address in the source address in the email address database 154c1, sets "pass" in the type identifier and the result identifier, respectively, and sets 0 in the number of determination. In addition, "*" indicating that inquiry about a value is not performed may be set in the destination address and the terminal identifier which are associated with the source address in the email address database 154c1, or the email address of the owner of the address book data and the terminal identifier of the terminal device used by the owner may be obtained and set therein.

In contrast, the email filter data 154b2 is generated as the following two types of sets of records. First, there is a record in which an email address given from the address book analyzer 1502, "*", and "pass" are set in the destination address, the source address, and the type identifier. Second, there is a record in which "others", "*", and "reject" are set in the destination address, the source address, and the type identifier. Further, the email filter data generator 1504 registers the destination address in which the "pass" is set in the type identifier in the email filter data 154b2 in the email address database 154c2. Further, in FIG. 4, in order to avoid complexity of the drawings, the illustration of an arrow representing the access by the email filter data generator 1504 to the email address database 154b2 is omitted. The email address database 154c2 is a database having the same structure (see FIG. 7) as that of the email address database 154c1. The email address database 154c2 stores information regarding an email transmitted from the in-house LAN 20 to the wide area network 30. For example, a source email address of the email, a destination email address of the email, and a terminal identifier of the terminal device which is the source of the email are respectively set in the source address, the destination address, and the terminal identifier. The registration of the respective pieces of data to the email address database 154c2 is basically performed by the filter 1506b, but the destination address in the email filter data 154b2 in which "pass" is set in the type identifier is registered by the email filter data generator 1504. When the destination address in the email filter data 154b2 in which "pass" is set in the type identifier is registered in the email address database 154c2, the email filter data generator 1504 sets the destination address in the destination address in the email address database 154c2, sets "pass" in the type identifier and the result identifier, respectively, and sets 0 in the number of determination. In addition, "*" indicating that inquiry about a value is not performed may be set in the source address and the terminal identifier which are associated with the destination address in the email address database 154c2, or the email address of the owner of the address book data and the terminal identifier of the terminal device used by the owner may be obtained and set therein.

As described above, the email filter data 154b1 is data defining a filtering condition of an email received in the in-house LAN 20 from the wide area network 30, and since "*" is set in all destination addresses in the email filter data 154b1, the filtering of the email received in the in-house LAN 20 from the wide area network 30 is performed based on the source email address of the email. Therefore, in the present embodiment, among the emails received in the in-house LAN 20 from the wide area network 30, the relay device 10 filters emails having email addresses which have not been registered in the address book of the user and are not the email address of the relay device 10, as the source email address. This is performed in order for the user not to receive an email transmitted from unknown other party unconditionally. Similarly, an email transmitted from the user to an unknown other party is also filtered based on the email filter data 154b2.

Since such email filter data generation operation is performed, the operation manager of the in-house LAN 20 can cause the control unit 110 to generate and store the email filter data 154b1 and 154b2 only by connecting the storage device in which the address book data of each user of the in-house LAN 20 is stored to the external device I/F unit 140 of the relay device 10. In addition, in the present embodiment, the case of registering the email address that has been registered in the address book data in both the email filter data 154b1 and 154b2 has been described, but the setting change of the email filter data generator 1504 may be performed so as to register the email address in only one thereof.

(B-2: Relay Operation of Email Received by In-house LAN 20 from Wide Area Network 30)

Figures 5, 6:
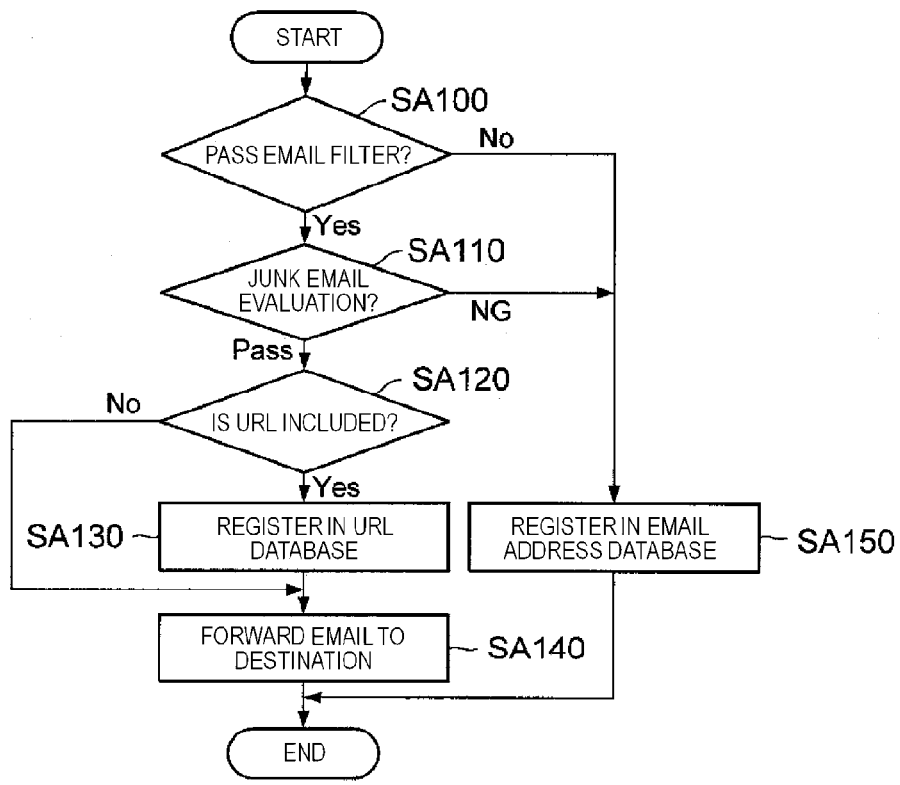
FIG. 5 is a diagram illustrating an example of email filter data 154b1 and 154b2 stored in a non-volatile storage unit 154 of the relay device 10.
FIG. 6 is a flowchart illustrating a flow of relay control of an email received by an in-house LAN 20 from a wide area network 30 side.

Next, the relay operation of an email received in the in-house LAN 20 from the wide area network 30 will be described. FIG. 6 is a flowchart illustrating a flow of a relay operation of the email received in the in-house LAN 20 from the wide area network 30 side. The email received in the in-house LAN 20 from the wide area network 30 is given to the control unit 110 through the second communication I/F unit 130. In this manner, the email transmitted to the control unit 110 through the second communication I/F unit 130 is first subjected to a filtering evaluation by the filter 1506a (step SA100). This is described in more detail, and the filter 1506a sets the source email address written in a header portion of the email received from the second communication I/F unit 130 as an address to be determined, and determines whether or not the address to be determined matches any of the source address associated with the type identifier "pass" in the email filter data 154b1.

When the determination result of step SA100 is "Yes", the filter 1506a gives the email to the email checker 1508. In contrast, when the determination result of step SA100 is "No", the filter 1506a registers the source email address and the destination email address of the email, and a terminal identifier uniquely identifying a terminal device of the destination of the email (for example, IP address) in the email address database 154c1 (step SA150), and the email in a predetermined storage area of the non-volatile storage unit 154, and ends the relay operation. In other words, in this case, the email to be evaluated is filtered by the relay device 10. In addition, in the present embodiment, the storage area serves as a role of the email storage section 1516 in FIG. 4.

The email address database 154c1 stores respective pieces of data of the type identifier, the result identifier, and the number of determinations in association with the source email address and the destination email address of the email which is filtered by the filter 1506a and the terminal identifier of the terminal device of the destination of the email (hereinafter, the source email address and the like). The type identifier is an identifier having a value of any of "pass", "reject" and "none", and represents "has passed", "not passed", and "postponement of determination about pass" of the email specified by the source address and the destination address associated with the type identifier, respectively. The result identifier represents whether the reception is finally allowed or the reception is rejected, with respect to the email for which determination about "pass" is postponed. At the time of registration of the source email address and the like to the email address database 154c1 by the filter 1506a, the same value as the type identifier (in the present embodiment, "none") is set in the result identifier. Then, the result identifier in which the value "none" is set is updated to "pass" or "reject" when final determination whether to perform the reception is made.

When the source email address and the like of the filtered email is registered in the email address database 154c1, first, the filter 1506a determines whether or not the source email address and the like has been registered. When the source email address has not been registered, the filter 1506a writes the source email address and the like to be intended to be registered in association with "none" as the type identifier, "none" as the result identifier, and "0" as the number of determination, in the email address database 154c1. In contrast, when the source email address has been registered, the filter 1506a counts up the value of the number of determinations stored in the email address database 154c1 by one in association with the source email address and the like as the source email address and the like to be intended to be registered.

In step SA110 performed when the determination result of step SA100 is "Yes", the email checker 1508 saves the source email address of the email given from the filter 1506a in a predetermined storage area of the volatile storage unit 152 and gives the email to an evaluation program. Here, the operation of the evaluation program when it is determined that the email is the junk email is determined by the specifications and settings of the evaluation program, and various aspects are considered. First, there is an aspect of discarding the email to be evaluated. Second, there is an aspect of writing and isolating the email to be evaluated in a predetermined storage area of the non-volatile storage unit 154 (a storage area that is set by the evaluation target program). In the cases of the first and second aspects, the email to be evaluated is not returned from the evaluation program to the email checker 1508, and the email is not forwarded to the destination. A third aspect is an aspect of giving information indicating that the email to be evaluated is a junk email, and a fourth aspect is an aspect of deleting computer virus and the like from the email to be evaluated. The third and fourth aspects are employed in the case in which a setting of receiving also the junk email has been made in the evaluation program. When the third or fourth aspect is employed in the evaluation program, the evaluation result (whether or not the email is a junk email) and an email in which information indicating that the email is a junk email is attached is returned to the email checker 1508.

When the email has not passed the evaluation by the evaluation program (a case in which the email is discarded or separated by the evaluation program: step SA110: "NG"), the email checker 1508 updates a result identifier stored in the email address database 154c1 in association with the source email address of the email to be evaluated from "pass" to "none" (step SA150), and the relay operation is ended. In contrast, when the email has passed the evaluation by the evaluation program (a case in which the email is not a junk email, or a case in which a setting of receiving a junk email is made: step SA110: "pass"), the email checker 1508 writes an evaluation result through the program (when the email is a junk email, "NG", and when the email is not a junk email, "OK") in a predetermined storage area of the volatile storage unit 152, and gives the email that has passed the evaluation by the evaluation program to the URL checker 1510.

The URL checker 1510 analyzes the email given from the email checker 1508 so as to determine whether or not the email includes a URL in an email text (step SA120). Here, the URL refers to an identifier uniquely indicating resources available through the wide area network 30 such as web site. In general, since the URL is a string that begins with "HTTP" or "HTTPS", when the string that begins with "HTTP" or "HTTPS" is included in the email text represented by the email given from the email checker 1508, the URL checker 1510 determines that the URL is included in the email text.

With respect to the email that is determined to include the URL in the email text, the URL checker 1510 gives the email to the first communication I/F unit 120 so as to forward the email to the destination (step SA140), after registering the URL and the like in the URL database 154d (step SA130). In contrast, with respect to the email that is determined not to include the URL in the email text, the URL checker 1510 gives the email to the first communication I/F unit 120 so as to forward the email to the destination, without registering the URL and the like in the URL database 154d. In other words, in the present embodiment, the email that has passed the checking by the email checker 1508 and is given to the URL checker 1510 is forwarded to the destination without inquiring whether or not the URL is included in the text.

FIG. 8 is a diagram illustrating an example of storage details of the URL database 154d. As illustrated in FIG. 8, the URL database 154d stores the URL, a result identifier, a junk email identifier, and a number of receptions in association with the source email address, the destination email address of the email including a URL in an email text, and the terminal identifier of the destination of the email. The result identifier represents that the access to the URL associated with the result identifier is approved (pass) or is not approved (reject) by the user, or the inquiry about the approval is not made yet (none). The junk email identifier represents that the email including a URL in the email text is not evaluated as a junk email (OK), or is evaluated as a junk email (NG). An evaluation result (a value stored in a predetermined storage area of the volatile storage unit 152 by the email checker 1508) that is returned from the evaluation program is set in the junk email identifier.

When registering the URL and the like in the URL database 154d, the URL checker 1510 first determines whether or not a set of the URL, the source email address and the destination email address of the email including a URL in the email, and the terminal identifier of the destination has been already registered. When the set has not been registered, the URL checker 1510 writes the set of the URL, the source email address, the destination email address, and the terminal identifier of the destination in the URL database 154d, in association with "none" as the result identifier, a value according to an evaluation result by the evaluation program as the junk email identifier, and "0" as the number of receptions. In contrast, when the set has been already registered, the number of receptions which is stored in the URL database 154d in association with the set of the URL, the source email address, the destination email address, and the terminal identifier of the destination is counted up by one.

Since the above operation is performed, among emails received by the user of the terminal device of the in-house LAN 20 from the wide area network 30 side, an email received from an unknown user is filtered by the filter 1506a and accumulated in the email storage section 1516. Further, even if there is an email that has passed the filtering by spoofing the source email address, the email that has not passed the evaluation by the evaluation program is not forwarded to the destination. The email that passes the filtering and passes the evaluation by the evaluation program is forwarded to the destination, but when a URL is included in the email text of the email, the URL is registered in the URL database 154d, and is used at the time of a relay operation of the web access from the in-house LAN 20 to the wide area network 30.

Hitherto, the relay operation of an email received in the in-house LAN 20 from the wide area network 30 side has been described.

(B-3: Relay Operation of Email Transmitted from In-house LAN 20 to Wide Area Network 30)

FIG. 9 is a diagram illustrating a flow of a relay operation of an email transmitted from the in-house LAN 20 side to the wide area network 30. Step SA200 and Step SA250 in FIG. 9 respectively correspond to Step SA100 and Step SA150 in FIG. 6. As is apparent from the comparison between FIG. 9 and FIG. 6, a relay operation of an email transmitted from the in-house LAN 20 side to the wide area network 30 is different from the relay operation of an email received in the in-house LAN 20 from the wide area network 30 in that step SA200 is performed instead of step SA100, step SA120 and step SA130 are omitted, and step SA250 is performed instead of step SA150. Hereinafter, a description will be mainly made about step SA200 and step SA250 which are different from the relay operation of an email received in the in-house LAN 20 from the wide area network 30.

The step SA200 in FIG. 9 is a process performed by the filter 1506b in response to the reception of an email from the in-house LAN 20 through the first communication I/F unit 120. In step SA200, the filter 1506b performs a filtering based on the destination email address of the received email by referring to the email filter data 154b2. A description is made in more detail, and when the type identifier stored in the email filter data 154b2 in association with the destination email address of the received email is "pass", the filter 1506b determines that the email is not a filtering target (step SA200: Yes).

The step SA250 in FIG. 9 is a process of registering the destination email address of the email that is determined as a filtering target in step SA200 and the like in the email address database 154c2. The table format of the email address database 154c2 is the same as the table format of the email address database 154c1. However, the email address database 154c2 does not store the terminal identifier of the destination, but stores the terminal identifier of the terminal device which is the source of the email that is determined as the filtering target. Further, the step SA250 is different from the step SA150 described above in that only registration of the destination email address and the like to the email address database 154c2 is performed, and the writing of the email in the email storage section 1516 is not performed.

Hitherto, the relay operation of an email transmitted from the in-house LAN 20 to the wide area network 30 side has been described.

(B-4: Relay Operation of Web Access from In-house LAN 20 to Wide Area Network 30)

Next, a relay operation of web access from the in-house LAN 20 to the wide area network 30 will be described. FIG. 10 is a flowchart illustrating a flow of the relay operation. The URL of an access destination of the web access is given to the redirect section 1512 through the first communication I/F unit 120. The redirect section 1512 first determines whether or not the URL addressed to the web access that is received from the first communication I/F unit 120 and the terminal identifier of the source of the web access match any of the sets of the URL and the terminal identifier stored in the URL database 154d in association with the result identifier "none" or "reject" (step SA300).

When the value of the terminal identifier stored in the URL database 154d in association with the set of the URL addressed to the web access and the terminal identifier of the source of the web access is "reject", the redirect section 1512 returns HTML data of a screen describing a message indicating rejection of the access, to the source of the web access (step SA340). The screen is displayed on the terminal device that receives the HTML data according to the HTML data.

When the value of the terminal identifier stored in the URL database 154d in association with the set of the URL addressed to the web access and the terminal identifier of the source of the web access is "none", the redirect section 1512 returns HTML data of a screen that describes a message inquiring whether to continue the access, to the source of the web access (step SA330). From the perspective of the user who instructs web access, its own web access looks as if being redirected to the access to another screen by the operation of the redirect section 1512. Hereinafter, a screen displayed on the terminal device of the source of the web access by the operation of redirect section 1512 (in other words, a screen that is different from the original access destination by web access) is referred to as a "redirect screen".

FIG. 11(a) and FIG. 11(b) are diagrams illustrating an example of the redirect screen. A description is given in more detail, and FIG. 11(a) is a diagram illustrating the redirect screen displayed on the terminal device of the source of the web access when a junk email identifier stored in the URL database 154d in association with the URL, the terminal identifier, and the result identifier of a value "none" is "OK". In contrast, FIG. 11(b) is a diagram illustrating the redirect screen displayed on the terminal device of the source of the web access when the junk email identifier stored in the URL database 154d in association with the URL, the terminal identifier, and the result identifier of a value "none" is "NG". When the junk email identifier stored in the URL database 154d in association with the URL, the terminal identifier, and the result identifier of a value "none" is "OK", the redirect section 1512 returns HTML data of the redirect screen illustrated in FIG. 11(a). In contrast, when the junk email identifier stored in the URL database 154d in association with the URL, the terminal identifier, and the result identifier of a value "none" is "NG", the redirect section 1512 returns HTML data of the redirect screen illustrated in FIG. 11(b). In general, there is a doubt about the reliability of the other party that transmits a junk email. In the present embodiment, since the display contents of the redirect screen is varied by reflecting the check result of the email checker 1508, the user recognizes the degree of risk of continuing the web access.

The redirect screen is displayed according to the HTML data on the terminal device that has received the HTML data. The user who recognizes the redirect screen can instruct allowance of the continuation of web access by clicking a mouse on an [ALLOW] button in the redirect screen of FIG. 11(a) or FIG. 11(b), and rejection of the continuation of web access by clicking a mouse on a [REJECT] button therein. If instructing whether to continue the web access by operating the redirect screen in FIG. 11(a) or FIG. 11(b), the terminal device returns a response to which the instructed content of the user is reflected, to the relay device 10. When a response indicating rejection is received, the redirect section 1512 changes the result identifier stored in the URL database 154d in association with the URL and the terminal identifier from "none" to "reject", and ends the web access relay process. Hereinafter, even if the source of the web access performs web access by using the URL as an access destination, since the result identifier stored in the URL database 154d in association with the terminal identifier of the source and the URL is "reject", the process of step SA340 described above is performed. In other words, after a response indicating not continuing the access is performed, an inquiry using the redirect screen of FIG. 11(b) is not performed again.

In contrast, when a response indicating allowance is received, the redirect section 1512 updates the result identifier stored in the URL database 154d in association with the URL and the terminal identifier from "none" to "pass", passes the web access message to the second communication I/F unit 130, and ends the web access relay process. Hereinafter, the web access is appropriately routed by the relay device in the wide area network 30, reaches the web server device of the destination, and HTML data corresponding to the URL indicating the destination of the web access is replied from the web server device. The HTML data is transmitted to the terminal device being the source of the web access through the wide area network 30, the relay device 10 and the in-house LAN 20, and a screen is displayed on the terminal device according to the HTML data. Hereinafter, even if the source of the web access performs web access by using the URL as an access destination, since the result identifier stored in the URL database 154d in association with the URL and the terminal identifier of the source is "pass", step SA310 and the subsequent process are performed. Accordingly, after there is a response indicating the continuation of access, an inquiry using the redirect screen of FIG. 11(a) is not performed again.

The process returns to step SA300 in FIG. 10. When the value of the type identifier stored in the URL database 154d in association with a set of the URL addressed to web access and the terminal identifier of the source of the web access is "pass", or when the set of the URL addressed to web access and the terminal identifier of the source of the web access is not registered in the URL database 154d, the redirect section 1512 determines whether or not there has been an email that is received by the terminal device being the source of the web access from the wide area network 30 and of which forwarding has been postponed by the relay device 10, and there has been an email that is transmitted from the terminal device being the source of the web access to the wide area network 30 and of which forwarding has been postponed by the relay device 10, with reference to the stored content in the email address databases 154c1 and 154c2 (step SA310). Specifically, when a record including the terminal identifier of the source of the web access and of which a value of the result identifier is "none" is registered in the email address database 154c1, the redirect section 1512 determines that there is a former email, and when a record including the terminal identifier and of which a value of the result identifier is "none" is registered in the email address database 154c2, the redirect section 1512 determines that there is a latter email. When there has been an email of which forwarding has been postponed by the relay device 10, the redirect section 1512 passes a web access message to the first communication I/F unit 120 (step SA320), and ends the web access relay process.

In contrast, when the email is an email of which forwarding is postponed, the redirect section 1512 returns the HTML data of the redirect screen that describes a message inquiring whether to perform forwarding to the source of the web access (step SA330). FIG. 12(a) and FIG. 12(b) are diagrams illustrating an example of the redirect screen. FIG. 12(a) is a diagram illustrating an example of the redirect screen when there has been the email that is received by the terminal device being the source of the web access from the wide area network 30 and of which forwarding has been postponed by the relay device 10. Meanwhile, FIG. 12(b) is a diagram illustrating an example of the redirect screen when there has been the email that is transmitted from the terminal device of the source of the web access to the wide area network 30 and of which forwarding has been postponed by the relay device 10. The user who recognizes the redirect screen illustrated in FIG. 12(a) can instruct whether to perform forwarding for each source by checking the check box corresponding to the source email address that is desired (rejected) to be forwarded and selecting [ALLOW] (or [REJECT]), and return a response to which the instruction content is reflected, to the terminal device. Similarly, the user who recognizes the redirect screen illustrated in FIG. 12(b) can instruct whether to perform forwarding for each destination by checking the check box corresponding to the destination email address that is desired (rejected) to be forwarded and selecting [ALLOW] (or [REJECT]), and return a response to which the instruction content is reflected, to the terminal device.

Meanwhile, if the response is received, the redirect section 1512 registers the source email address (or the destination email address) in the email filter data 154b1 (or the email filter data 154b2) in association with the type identifier "pass" so as not to postpone of the forwarding, with respect to the email that is forwarded from the source and is instructed to allow forwarding through the response (or an email addressed to a destination and instructed to allow forwarding), and updates the result identifier that is registered in the email address database 154c1 (or the email address database 154c2) in association with the email address and the terminal identifier of the source of the response, to "pass".

Further, according to a response for the redirect screen illustrated in FIG. 12(a), when forwarding of an email received by the terminal device being the source of the web access from the wide area network 30 is allowed, the redirect section 1512 reads the corresponding email from the email storage section 1516, and gives the email to the email generator/transmitter 1514. Here, the corresponding email refers to an email of which the source address and the destination address which are stored in email address database 154c1 in association with the terminal identifier of the source of the response and the type identifier of a value "pass" is the source email address and the destination email address, among emails stored in the email storage section 1516. The email generator/transmitter 1514 rewrites the source email address in the header part of the email to the email address indicating the relay device 10, and transmits the source email address to the email server of the wide area network 30. Hereinafter, although the email is received by the email server in the wide area network 30, and is forwarded to the terminal device according to a request and the like from the terminal device, since the email address of the relay device 10 which is the source email address is registered in the email filter data 154b1 in association with the type identifier "pass", the email is not filtered by the filter 1506a, and forwarded to the terminal device.

In contrast, with respect to the email transmitted from a source for which rejection of forwarding is designated by the response (or an email addressed to a destination for which rejection of forwarding is designated), the result identifier registered in the email address database 154c1 (or email address database 154c2) in association with the source email address (or destination email address) and the terminal identifier of the source of the response is updated to "reject". In this manner, thereafter, with respect to the email using an email address of which the result identifier registered in the email address database 154c1 (or email address database 154c2) has been updated to "reject" as a source email address (or a destination email address), it is not determined as the email of which forwarding is postponed, in step SA310.

According to the present embodiment, registration of the URL to the URL database 154d is performed immediately in response to the relay of the email that is received in the in-house LAN 20 from the wide area network 30 and in which a URL is described in a text. Then, when web access from the terminal device in the in-house LAN 20 to the web server device of the wide area network 30 is detected, the relay device 10 determines whether or not the URL addressed to the web access is registered in the URL database 154d, and when the URL is registered in association with the type identifier indicating the rejection of access, the web access is rejected.

Meanwhile, when determination of whether to access the URL is not performed yet, the relay device 10 displays a redirect screen inquiring whether to continue the web access on the terminal device, and when a response indicating access is obtained, the relay device 10 relays the web access. Therefore, according to the present embodiment, there is no occurrence of failure (expansion of virus infection and fraud caused by quick registration not being performed) caused by that the URL registration to the URL database 154d is not performed until the email flow rate exceeds the predetermined threshold. In addition, in the present embodiment, when there is an email of which forwarding is postponed at the time of web access to the web site of which permission has been already made or the web access to the URL which is not registered in the URL database 154d, the access source is notified and caused to determine whether to perform forwarding, the email filter is quickly updated with reference to the result of the determination, and thus it is possible to prevent the occurrence of failure in the transmission and reception of an email later. In addition, it is not essential to save and forward the email of which forwarding is postponed, and when saving and forwarding are omitted, the email generator/transmitter 1514 and the email storage section 1516 may be of course omitted.

In the embodiment, whether to continue the web access and whether to forward the email of which forwarding has been postponed are respectively inquired through respective redirect screens, but as illustrated in FIG. 13, the inquiry may be performed through one redirect screen. Specifically, in step SA300 of FIG. 10, searching the URL database 154d and searching the email address databases 154c1 and 154c2 may be performed, and a redirect screen which varies depending on the research result may be displayed. For example, when the value of the type identifier stored in the URL database 154d in association with the set of the URL addressed to web access and the terminal identifier of the source of the web access is "none", and forwarding of the email is not postponed, the redirect screen illustrated in FIG. 11(a) or FIG. 11(b) is displayed depending on the result of junk email check, and when there is an email of which forwarding is postponed, the redirect screen illustrated in FIG. 13 is displayed. In addition, when the redirect screen illustrated in FIG. 13 is displayed, the update of the URL database 154d, the email address database 154c1 (or 154c2), and the email filter data 154b1 (or 154b2) may be of course performed in response to an operation for the screen.

In the embodiment, an email of which forwarding is postponed by the relay device 10 among emails received in the in-house LAN 20 from the wide area network 30 (in other words, an email filtered by the filter 1506a) is stored in the email storage section 1516, may be a target of the email transmission process by the email generator/transmitter 1514. However, an email of which forwarding is postponed by the relay device 10 among emails transmitted from the in-house LAN 20 to the wide area network 30 (in other words, an email filtered by the filter 1506b) also are stored in the email storage section 1516, may be a target of the email transmission process by the email generator/transmitter 1514. However, in this case, it is not necessary to perform rewriting of the source email address by the email generator/transmitter 1514, and the email stored in the email storage section 1516 may be transmitted to the wide area network 30, as it is.

In the embodiment, when filtering by the filter 1506b is performed, postponement of forwarding is not notified through the redirect screen, a transmission instruction of an email notifying that forwarding is postponed in which link information to the redirect screen illustrated in FIG. 12(b) is described is given from the filter 1506b to the email generator/transmitter 1514, a process of transmitting the email may be performed by the email generator/transmitter 1514.

In this case, in order for the email to pass the checking by the URL checker 1510, an email of which the email address of the relay device 10 is a source email address may be exempted from check target of the URL checker 1510. Further, other than the email address of the relay device 10, a source email address to be exempted from the check target by the URL checker 1510 may be determined.

(C: Modification)

The above description has been made of the embodiments of the present invention, but the following modifications may of course be applied to the embodiments.

(1) In the embodiment, it is assumed that both the email received from the in-house LAN 20 to the wide area network 30 and the email transmitted from the in-house LAN 20 to the wide area network 30 are a target of the email filter check, but only the former may be the target of the email filter check. When performing the email filter check only on the email received from the in-house LAN 20 to the wide area network 30, the filter 1506b may be omitted. Further, checking whether or not an email is the junk email is not necessarily essential, but the email checker 1508 may be omitted. Further, the email filter data 154b1 and 154b2 may be sent to the relay device 10 through the external device I/F unit 140, and it is possible to omit the address book analyzer 1502 and the email filter data generator 1504 in this case. Further, in the embodiment, the web server device is used as an example of a resource available through the wide area network 30, but other devices such as an FTP server device, various pieces of data stored in the server devices, or programs executed by the server devices may be used. Further, the URL is used as the identifier indicating the resource in the embodiment, but the Uniform Resource Identifier (URI) may be of course used. In short, any identifier uniquely indicating resources available through the wide area network may be used.

(2) In the embodiment, control access to web sites is performed for each terminal device (in other words, for each terminal identifier), but the control may be collectively performed for all terminal devices within the in-house LAN 20. Specifically, when the URL checker 1510 performs registration of URL in the URL database 154d, it performs the registration without associating the URL with the terminal identifier of the destination of email included in the email text, and the redirect section 1512 may perform the relay control depending on whether or not the URL of a web access destination is registered in the URL database 154d, and when the URL is registered, depending on which of "none", "pass" and "reject" the type identifier associated with the URL is.

(3) In the embodiment, the URL database 154d is stored in the non-volatile storage unit 154 of the relay device 10. However, the URL database 154d may be stored in a storage device (a hard disk drive corresponding to a network, and the like) which is connected to a communication network such as the in-house LAN 20 and the wide area network 30, and can be accessed by the control unit 110 of the relay device 10 through the communication network. In this case, one URL database may be shared by a plurality of relay devices.

(4) In the embodiment, the relay device 10 that connects the in-house LAN 20 to the wide area network 30 has both a function of preventing fraud or the like caused by inadvertent web access and a function of filtering an email transmitted from a source unknown to a recipient and a junk email, but the relay device 10 may have only one function thereof. As a configuration example of a relay device having only the former function, it is considered a configuration causing a relay device that connects a local area network to a wide area network to include URL checker for determining whether a URL is included in an email received by the local area network from the wide area network, and when the URL is included, registering the URL in a URL database; and redirect section for determining whether or not a URL corresponding a web server device is registered in the URL database when access from a terminal device in a local area network to the web server device connected to the wide area network is detected, displaying a redirect screen inquiring whether to perform the web access on the terminal device when the URL is registered in the URL database, and relaying the web access when a response of allowing the access is obtained. The reason is that it is possible to prevent fraud or the like caused by inadvertent web access, even in such a relay device.

Further, as a configuration example of a relay device having only the latter function (the function of filtering an email transmitted from a source unknown to a recipient and a junk email such as an email including virus), it is considered a configuration causing a relay device that connects a local area network to a wide area network to include a filter for performing at least a first filtering process, among the first filtering process of filtering an email received by a terminal device in a local area network from a wide area network based on a source email address and a second filtering process of filtering an email transmitted from the terminal device to the wide area network based on a destination email address; an email checker for checking whether or not an email which is not filtered by the filter is a junk email, and forwarding the email to a destination when it is determined that the email is not the junk email; an address book analyzer for analyzing email address book data of the terminal device within the local area network, and extracting an email address; and an email filter data generator for generating email filter data indicating a filtering condition of the filter based on the email address extracted by the address book analyzer and giving the email filter data to the filter.

As an example of the related art for filtering control based on the email address book data, the technology disclosed in Patent Literature 2 is presented, but as described above, the technology has a constraint that an email addressed to another party cannot be transmitted when the user's own email address is not registered in address book of the other party, and a constraint that it is necessary for the users transmitting and receiving emails to use the same system, but there is a problem that an actual situation is different. In contrast, in the relay device having a configuration formed by combining the filter, the email checker, the address book analyzer, and the email filter data generator, it is possible to filter an email transmitted from a source unknown to a recipient and a junk email, without any particular restriction.

(5) In the embodiment, each means showing significant features of the present invention is implemented by a software module, but each means may of course be implemented by an electronic circuit, and the relay device of the present invention may be implemented by combining the electronic circuits.

(6) In the embodiment, programs showing significant features of the present embodiment (relay control program 154a) are previously stored in the non-volatile storage unit 154 of relay device 10. However, the program may be of course distributed while being written on a computer-readable recording medium such as a Compact Disc-Read Only Memory (CD-ROM), or may be distributed by downloading through a telecommunication line such as the Internet. The reason is because operating a general computer according to the program which has been distributed in this manner enables a computer to function as a relay device of the present invention.

(7) In the embodiment, the case has been described in which transmission and reception of an email is performed by using a mailer which is installed in the terminal device PC1 and the terminal device PC2. However, the email of the present invention includes a so-called Web email. In other words, a configuration may be considered in which the terminal device transmits and receives an email by using an email client of a Web application that performs access through a Web browser installed on the terminal device, and the relay device process the email.

(8) The connection (communication path) between the relay device 10 and the in-house LAN 20 may be wired or wireless. When the connection is wireless, the relay device functions as a wireless relay device such as a wireless LAN router and a wireless access point.

This application is based on Japanese patent application No. 2013-103857 filed on May 16, 2013, the contents of which are incorporated herein by reference.

REFERENCE SIGNS LIST

10: RELAY DEVICE
20: IN-HOUSE LAN
30: WIDE AREA NETWORK
110: CONTROL UNIT
120: FIRST COMMUNICATION I/F UNIT
130: SECOND COMMUNICATION I/F UNIT
140: EXTERNAL DEVICE I/F UNIT
150: STORAGE UNIT
152: VOLATILE STORAGE UNIT
154: NON-VOLATILE STORAGE UNIT
154*a*: RELAY CONTROL PROGRAM
154*b*1, 154*b*2: EMAIL FILTER DATA
154*c*1, 154*c*2: EMAIL ADDRESS DATABASE
154*d*: URL DATABASE
160: BUS

The invention claimed is:

1. A relay device which connects a local area network to a wide area network, the relay device comprising:
a processor and a memory storing instructions, the processor executing the stored instructions to:
receive an email destined for a terminal device within the local area network from the wide area network;
determine whether or not an identifier uniquely indicating an available resource through the wide area network is included in the received email;
register the identifier in a database when it is determined that the identifier is included in the email; and
transfer the email to the terminal device within the local area network, the processor further executing the stored instructions to:
detect access from a terminal device within the local area network to a resource available through the wide area network;
determine whether or not an identifier indicating the resource available through the wide area network is registered in the database in response to detection of the access from the terminal device to the available resource;
display a screen inquiring whether to perform the access in the terminal device when it is determined that the identifier is registered in the database; and
relay the access when a reply allowing the access is obtained through the displayed screen.

2. A relay device which connects a local area network to a wide area network, the relay device comprising:
a processor and a memory storing instructions, the processor executing the stored instructions to:
determine whether or not an identifier uniquely indicating an available resource through the wide area network is included in an email that the local area network receives through the relay device from the wide area network; and
register the identifier in a database when it is determined that the identifier is included in the email; and
the processor further executing the stored instructions to:
detect access from a terminal device within the local area network to a resource available through the wide area network;
determine whether or not an identifier indicating the resource available through the wide area network is registered in the database in response to detection of the access from the terminal device to the available resource;
display a screen inquiring whether to perform the access in the terminal device when it is determined that the identifier is registered in the database; and
relay the access when a reply allowing the access is obtained through the displayed screen,
the relay device further comprising:
a filter, configured to perform at least a first filtering process, among the first filtering process of filtering an email received in the local area network from the wide area network based on a source email address in the email, and a second filtering process of filtering an email transmitted from the local area network to the wide area network based on a destination email address of the email; and
an email address database for storing the source email address or the destination email address of the email which is filtered by the filter, and a terminal identifier indicative of a destination or source terminal device thereof, wherein
the redirect section determines whether there is an email that is filtered by the filter with reference to stored content of the email address database, among emails of which a destination or a source is a terminal device that performs access to the available resources through the wide area network, and displays a screen inquiring whether to release a filtering of a source email address with respect to the email that is filtered by the first filtering process in the terminal device, and displays a screen inquiring whether to release a filtering of a destination email address with respect to the email that is filtered by the second filtering process in the terminal device, and updates a filtering condition of the filter in response to an operation for each screen.

3. The relay device according to claim 2, further comprising:
an email storage section for storing the email that is filtered by the first filtering process; and
an email generator/transmitter, configured to transmit the email stored in the email storage section as an email using with the relay device as a source, wherein
the redirect section causes the email generator/transmitter to transmit an email transmitted to the terminal device from a source email address that is excluded from a filtering target, depending on update of the filtering condition of the first filtering process.

4. The relay device according to claim 2, further comprising:
an email checker, configured to check whether or not the email that is filtered by the filter is a junk email, wherein
the identifier checker checks an email that has passed a checking by the email checker as a check target.

5. The relay device according to claim 2, further comprising:
an address book analyzer, configured to analyze email address book data of a terminal device within the local area network and extract an email address; and
an email filter data generator, configured to generate email filter data representing a filtering condition used by the filter based on the email address extracted by the address book analyzer, and send the email filter data to the filter.

6. A control method of a relay device which connects a local area network to a wide area network, the control method comprising:
receiving an email destined for a terminal device within the local area network from the wide area network;
determining whether or not an identifier uniquely indicating an available resource through the wide area network is included in the received email;
registering the identifier in a database when it is determined that the identifier is included in the email;
transferring the email to the terminal device within the local area network;
detecting access from a terminal device within the local area network to a resource available through the wide area network;
determining whether or not an identifier indicating the resource available through the wire area network is registered in the database in response to detection of the access from the terminal device;
displaying a screen inquiring whether to perform the access in the terminal device when it is determined that the identifier is registered in the database; and
relaying the access when an reply allowing the access is obtained, through the displayed screen.

7. The relay device according to claim 1, further comprising:
a filter, configured to perform at least one filtering process, among the first filtering process of filtering an email received in the local area network from the wide area network based on a source email address in the email, and a second filtering process of filtering an email transmitted from the local area network to the wide area network based on a destination email address of the email, wherein
the redirect section inquires to the terminal device about whether to release a filtering of a source email address with respect to the email that is filtered by the first filtering process in the terminal device, or whether to release a filtering of a destination email address with respect to the email that is filtered by the second filtering process, and updates a filtering condition of the filter in response to an operation in the terminal device for an inquiry from the redirect section.

8. The relay device according to claim 1, further comprising:
a filter, configured to perform at least one filtering process, among the first filtering process of filtering an email received in the local area network from the wide area network based on a source email address in the email, and a second filtering process of filtering an email transmitted from the local area network to the wide area network based on a destination email address of the email; and an email address database for storing at least the source email address and the destination email address of the email which is filtered by the filter, wherein the redirect section determines whether there is an email that is filtered by the filter based on stored content of the email address database, among emails of which a destination or a source is a terminal device that performs access to the available resources through the wide area network.

9. The relay device according to claim 8, wherein the filter performs the first filtering process at least, the email address database further stores a terminal identifier indicative of a destination or source terminal device of the email which is filtered by the filter, and the redirect section inquires to the terminal device about whether to release a filtering of a source email address with respect to the email that is filtered by the first filtering process in the terminal device, or whether to release a filtering of a destination email address with respect to the email that is filtered by the second filtering process, and updates a filtering condition of the filter in response to an operation in the terminal device for an inquiry from the redirect section.

10. The relay device according to claim 9, wherein the redirect section displays a screen inquiring whether to release a filtering of a source email address with respect to the email that is filtered by the first filtering process in the terminal device, and displays a screen inquiring whether to release a filtering of a destination email address with respect to the email that is filtered by the second filtering process in the terminal device, and updates a filtering condition of the filter in response to an operation for each screen.

* * * * *